United States Patent
Flick

(12) 
(10) Patent No.: US 6,879,248 B2
(45) Date of Patent: Apr. 12, 2005

(54) BACK-UP WARNING SYSTEM FOR A VEHICLE AND RELATED METHOD

(75) Inventor: Kenneth E. Flick, Douglasville, GA (US)

(73) Assignee: Omega Patents, L.L.C., Douglasville, GA (US)

(*) Notice: Subject to any disclaimer, the term of this patent is extended or adjusted under 35 U.S.C. 154(b) by 279 days.

(21) Appl. No.: 09/870,846

(22) Filed: May 31, 2001

(65) Prior Publication Data

US 2002/0180595 A1 Dec. 5, 2002

(51) Int. Cl.[7] .................................................. B60Q 1/00
(52) U.S. Cl. ................... 340/435; 340/436; 340/463; 340/468; 340/901; 340/903; 340/904
(58) Field of Search ................... 340/435, 436, 340/438, 901, 903, 904, 463, 468, 471

(56) References Cited

U.S. PATENT DOCUMENTS

| | | | | |
|---|---|---|---|---|
| 4,278,962 A | * | 7/1981 | Lin .............................. | 340/34 |
| 4,404,541 A | * | 9/1983 | Kodera et al. ................ | 340/32 |
| 4,797,673 A | | 1/1989 | Dombrowski ................ | 340/904 |
| 4,851,813 A | | 7/1989 | Gottlieb ........................ | 340/474 |
| 4,864,298 A | | 9/1989 | Dombrowski ................ | 340/904 |
| 4,903,007 A | | 2/1990 | Gottlieb ........................ | 340/474 |
| 5,028,920 A | | 7/1991 | Dombrowski ................ | 340/904 |
| 5,047,747 A | | 9/1991 | Gottlieb ........................ | 340/463 |
| 5,181,019 A | | 1/1993 | Gottlieb et al. ............. | 340/474 |
| 5,198,798 A | | 3/1993 | Lietzow et al. ............. | 340/539 |
| RE34,773 E | | 11/1994 | Dombrowski ................ | 340/904 |
| 5,424,715 A | | 6/1995 | Lietzow et al. ............. | 340/539 |
| 5,440,288 A | | 8/1995 | Gottlieb et al. ............. | 340/463 |
| 5,515,026 A | | 5/1996 | Ewert .......................... | 340/436 |
| 5,515,285 A | | 5/1996 | Garrett, Sr. et al. ........ | 364/460 |
| 5,574,426 A | * | 11/1996 | Shisgal et al. .............. | 340/435 |
| 5,619,074 A | | 4/1997 | Berch et al. ................ | 307/10.2 |
| 5,650,765 A | | 7/1997 | Park ............................ | 340/436 |
| 5,682,136 A | | 10/1997 | Del Signore ................ | 340/436 |
| 5,838,227 A | | 11/1998 | Murray ....................... | 340/425.5 |
| 5,844,471 A | | 12/1998 | Daniel ......................... | 340/436 |
| 5,894,272 A | | 4/1999 | Brassier et al. ............. | 340/602 |
| 5,914,651 A | | 6/1999 | Smalls ......................... | 340/436 |
| 6,028,505 A | | 2/2000 | Drori ........................... | 340/426 |
| 6,049,273 A | | 4/2000 | Hess ............................ | 340/539 |
| 6,087,953 A | * | 7/2000 | DeLine et al. .............. | 340/438 |
| 6,339,369 B1 | * | 1/2002 | Paranjpe ...................... | 340/436 |

OTHER PUBLICATIONS

S&S Distributing, LLC, Model 1500 License Plate Frame Mount, 2001, available at www.guardianalert.com/1024/1500.htm.

S&S Distributing, LLC, Frequently Asked Questions, 2001, available at www.guardianalert.com/1024/FAQ.htm.

S&S Distributing, LLC, Installation Instructions for License Plate Frame Mount Model 1500, available at www.guardianalert.com.

* cited by examiner

*Primary Examiner*—Hung Nguyen
(74) *Attorney, Agent, or Firm*—Allen, Dyer, Doppelt, Milbrath & Gilchrist, P.A.

(57) ABSTRACT

A back-up warning system for a vehicle of a type including a back-up bulb connector includes a proximity sensor for positioning adjacent a rear of the vehicle, a proximity sensor connector for connecting the proximity sensor to the back-up bulb socket, and a warning indicator for providing a warning indication based upon the proximity sensor. The proximity sensor connector may connect the proximity sensor to the back-up bulb socket so that the proximity sensor is powered and operable to detect proximity of an object adjacent the rear of the vehicle when the vehicle is backing up.

49 Claims, 3 Drawing Sheets

BACK-UP WARNING SYSTEM FOR A VEHICLE AND RELATED METHOD

FIELD OF THE INVENTION

The present invention relates to the field of vehicles, and, more particularly, to vehicle warning systems.

BACKGROUND OF THE INVENTION

Audible alert systems are used in various types of motor vehicles to alert pedestrians, bicyclists, etc. that a vehicle is backing up. This is important because the driver of the vehicle may not be able to see a person behind the vehicle if the person is in a so-called "blind-spot." As such, these types of systems have become commonplace in large delivery trucks, heavy machinery, etc. where it may be particularly hard to see a person behind the vehicle.

Such systems are also becoming more popular in passenger vehicles such as cars and small trucks. For example, U.S. Pat. No. 4,851,813 to Gottlieb discloses a combination back-up light and sound emitting device for an automotive vehicle including a housing having a base at one end and a socket at the other end. A light bulb is mounted in the socket of the housing and a sound emitting device is also mounted in the housing. The base may be inserted in a vehicle back-up bulb socket so that the sound emitting device and the light bulb are activated when the vehicle is in reverse.

While such prior art systems are particularly useful for alerting people outside the vehicle that the vehicle is backing up toward them, these systems indiscriminately emit sound whenever the vehicle is placed in reverse. Because the emitted sound is intended to serve as a warning indicator, it is generally quite loud and often shrill. As a result, it may become bothersome to a driver to have this alert tone emitted whenever the vehicle is placed in reverse. This may be especially true when there are no objects or people adjacent the rear of the vehicle. Furthermore, such prior art systems do nothing to alert the driver whether an object or person is actually behind the vehicle. Thus, even if a person is alerted to a vehicle backing up toward him, he may not be able to get out of the way in time.

Several driver alerting devices have been created to address this problem. For example, some back-up warning systems include a transceiver mounted on a rear end of a vehicle for detecting objects close to the vehicle while the vehicle is in reverse. For example, U.S. Pat. No. RE 34,773; U.S. Pat. Nos. 4,797,673; 4,864,298; and 5,028,920 to Dombrowski disclose a driver alerting device including a transceiver mounted on the rear end of a vehicle (e.g., on the bumper) that directs a wave output rearwardly from the vehicle. Return wave signals from objects within range of the transceiver are picked up by an antenna and supplied to the transceiver. Any resulting Doppler shift detected by the transceiver causes the transceiver to provide an audible alert within the passenger compartment. The device may be electrically connected to the reverse gear of the vehicle for activation when the vehicle transmission is engaged in the reverse gear. One limitation of such devices is that they may be relatively bulky and require mounting on the back of the vehicle in a conspicuous location, such as on the vehicle's bumper. Accordingly, these devices may be unsightly and they may also require screws, etc. to securely fasten the device to the vehicle. Thus, there may be a significant potential for damage to the vehicle during installation, and this process may take a substantial amount of time to complete. Further, such devices protrude from the bumper and may therefore be damaged or even knocked off the vehicle. Additionally, not all vehicles have a suitable mounting location for such devices.

SUMMARY OF THE INVENTION

In view of the foregoing background, it is therefore an object of the invention to provide a back-up warning system for a vehicle that alerts a driver when objects are adjacent the rear of the vehicle, and that is relatively easy to install.

This and other objects, features, and advantages in accordance with the present invention are provided by a back-up warning system for a vehicle of a type comprising a back-up bulb connector. The back-up warning system may include a proximity sensor for positioning adjacent a rear of the vehicle, a proximity sensor connector for connecting the proximity sensor to the back-up bulb socket, and a warning indicator for providing a warning indication based upon the proximity sensor. The proximity sensor connector may connect the proximity sensor to the back-up bulb socket so that the proximity sensor is powered and operable to detect proximity of an object adjacent the rear of the vehicle when the vehicle is backing up.

More specifically, the vehicle may further include a rear light housing covering the back-up bulb connector, and the proximity sensor may be adjacent the proximity sensor connector to be within the rear light housing. Additionally, the warning indicator may be positioned within the rear light housing and also may be electrically connected to the proximity sensor.

Further, the vehicle may include a vehicle passenger compartment, and the warning indicator may be positioned within the vehicle passenger compartment. Moreover, a wireless communications link may connect the proximity sensor and the warning indicator. The wireless communications link may include a wireless transmitter for positioning within the vehicle rear light housing that is connected to the sensor, and a wireless transmitter for positioning within the vehicle passenger compartment that is connected to the warning indicator.

In addition, the warning indicator may be a visual warning indicator and may be carried by at least one rearview mirror of the vehicle. The warning indicator may also be an audible tone warning indicator. The audible tone warning indicator may generate an audible tone having a characteristic which varies based upon a distance between the rear of the vehicle and the object. Furthermore, the proximity sensor may be spaced apart from the proximity sensor connector and connected thereto by at least one wire. Alternatively, the proximity sensor may be carried by the proximity sensor connector.

The back-up warning system may further include a back-up light bulb carried by the proximity sensor connector and electrically connected to the vehicle back-up bulb connector. The proximity sensor may be a radar sensor. Also, the proximity sensor connector may further include a housing, and the proximity sensor may include sensing circuitry carried by the housing. Moreover, the sensing circuitry may include a signal emitter for emitting signals, and a signal collector for collecting reflected signals from the object. Also, the vehicle back-up bulb connector may be a socket, and the proximity sensor connector may be a plug that mates with the socket.

A method aspect of the invention is for providing a warning indication of an object adjacent a rear of a vehicle of a type comprising a back-up bulb connector. The method may include positioning a proximity sensor adjacent the rear of the vehicle and connecting the proximity sensor to the back-up bulb connector so that the proximity sensor is powered and operable when the vehicle is backing up. The method may further include detecting proximity of the object adjacent the rear of the vehicle using the proximity sensor when the vehicle is backing up, and providing the warning indication based upon the detected proximity.

DETAILED DESCRIPTION OF THE PREFERRED EMBODIMENTS

Figure 1:
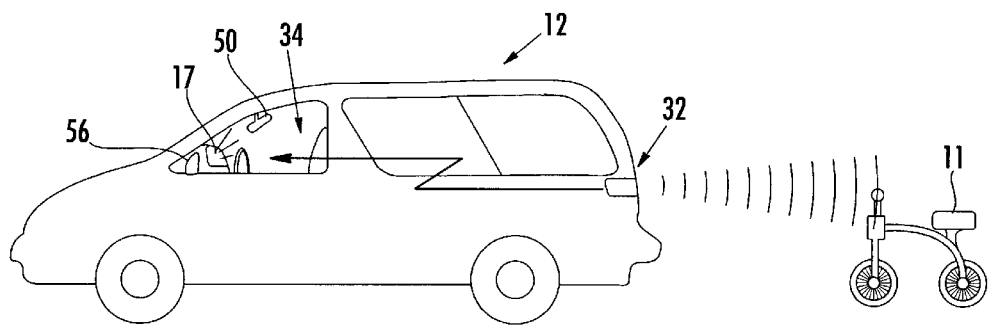
FIG. 1 is a perspective view of a vehicle including a back-up warning system according to the invention.
Figure 2:
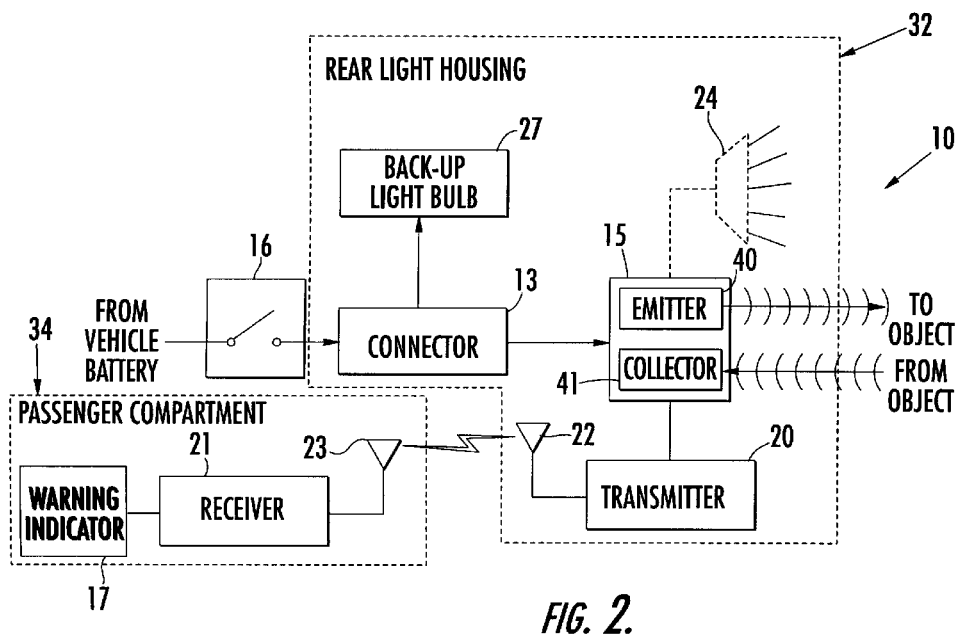
FIG. 2 is a schematic block diagram of a back-up warning system according to the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring to FIGS. 1–6, a back-up warning system 10 for a vehicle 12 of a type comprising a rear light housing 32 including a back-up bulb connector 36 is now described. The rear light housing 32 may further include a reflector 38 and a lens 33 covering the reflector and the back-up bulb connector 36. The back-up warning system 10 may include a proximity sensor 15 for positioning adjacent the rear of the vehicle 12. A proximity sensor connector 13 connects the proximity sensor 15 to the back-up bulb socket 36 so that the proximity sensor is powered and operable to detect proximity of an object 11 adjacent the rear of the vehicle 12 when the vehicle is backing up. That is, the proximity sensor 15 is powered by a back-up switch 16 connecting the back-up bulb connector 36 to the battery of the vehicle 12 when the vehicle is placed in reverse. The back-up switch 16 is typically associated with the transmission or gear selector of a vehicle.

Figure 3:
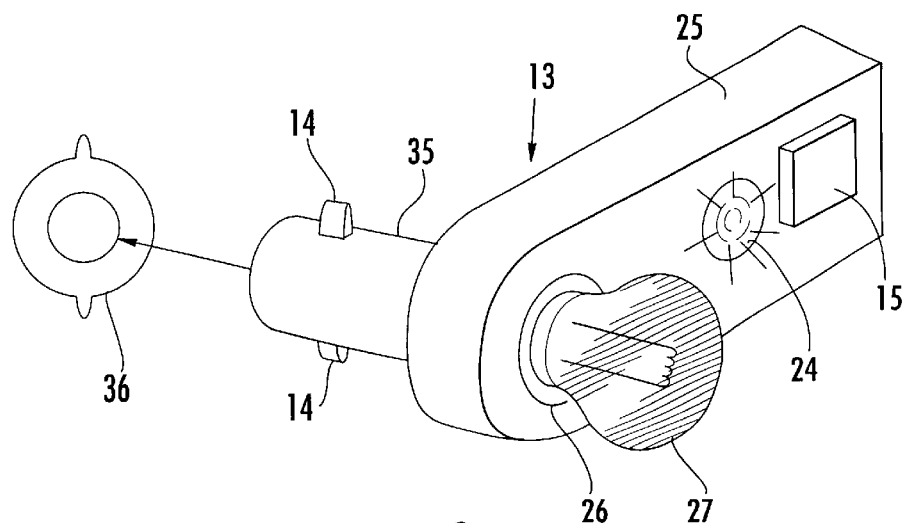
FIG. 3 is a perspective view of one embodiment of the back-up warning system of FIG. 2.

To connect the proximity sensor 15 to the back-up bulb socket 36, the proximity sensor connector 13 may include a plug 35 to be mated with the back-up bulb socket. For example, the plug 35 may include bayonet type connectors 14, as seen in FIG. 3, which are widely used for vehicle light bulbs. Of course, those of skill in the art will appreciate that other suitable attachments may also be used in accordance with the present invention, such as threads, for example. As a result, the proximity sensor connector 13 may be manufactured to attach to numerous back-up light bulb sockets and may easily be installed by a user in the same manner in which a replacement back-up light bulb would be installed.

The proximity sensor 15 may be a radar sensor, though other suitable sensors known to those skilled in the art may also be used, such as light sensors, sound sensors, etc. Moreover, the proximity sensor 15 may be adjacent the plug 35 to be within the rear light housing 32 and electrically connected to the back-up bulb socket 36 by the plug. The proximity sensor connector 13 may also include a housing 25 connected to the plug 35, and the proximity sensor 15 may include sensing circuitry carried by the housing.

More particularly, the sensing circuitry may include a signal emitter 40 for emitting signals, and a signal collector 41 for collecting reflected signals from the object 11. The housing 25 may also carry a back-up bulb 27, as may best be seen in FIG. 3. For example, the housing 25 may include a bulb socket 26 similar to the back-up bulb socket 36 in which the back-up bulb 27 may be inserted. Of course, numerous types of bulbs and bulb connectors may be used, as will be appreciated by those of skill in the art.

Those of skill in the art will also understand how to select and/or adjust the range of various proximity sensors for a given application. Generally speaking, it is preferable to have the range of the sensor set so that objects are detected from a far enough distance to give the driver adequate time to stop before hitting the object 11. On the other hand, it is also preferable not to set the range too far so that a warning indication is generated in situations where there is little likelihood of backing into the object 11.

The vehicle 12 may include a vehicle passenger compartment 34. According to the invention, a warning indicator 17 may advantageously be positioned within the vehicle passenger compartment 34. As seen in FIG. 1, the warning indicator 17 may be an audible tone warning indicator, as will be discussed further below. A wireless communications link may be used to connect the proximity sensor 15 and the warning indicator 17, which is also illustratively shown in FIG. 1. The wireless communications link may include a wireless transmitter 20 for positioning within the vehicle rear light housing 32 and connected to the proximity sensor 15, and a wireless transmitter 21 for positioning within the vehicle passenger compartment 34 and connected to the warning indicator 17. The wireless transmitter 20 and the wireless receiver 21 may communicate via respective antennas 22, 23.

Figure 4:
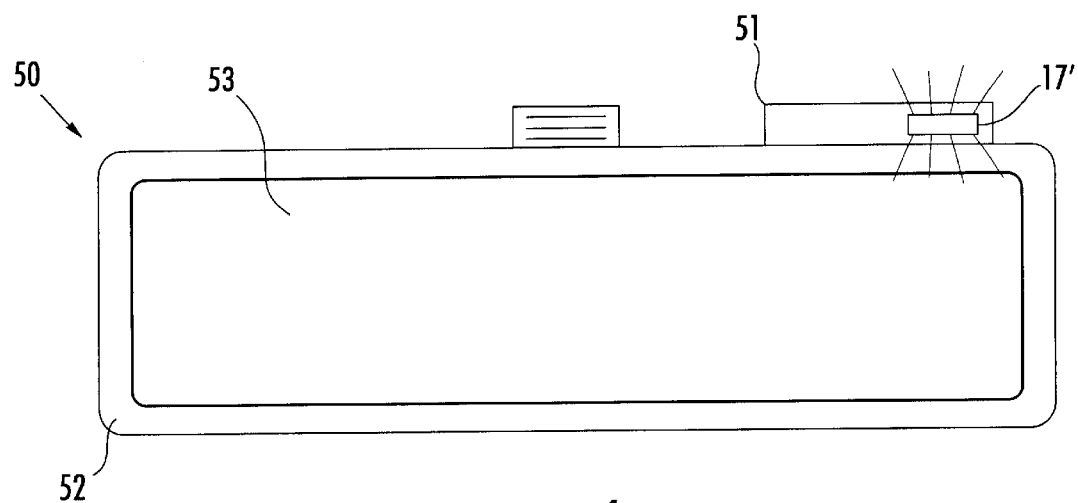
FIG. 4 is a perspective view of a vehicle rearview mirror illustrating one embodiment of the warning indicator of FIG. 2.

As a result, the warning indicator 17 may be relatively easily installed within the vehicle passenger compartment 34 without the need to run wires therein. As shown in FIG. 4, for example, the wireless receiver 21 and a visual warning indicator 17' (described further below) may be included within a housing 51 that may be mounted within the vehicle passenger compartment 34 on an interior rearview mirror 50. The housing 51 may be attached by adhesive, hook-and-loop fasteners (e.g., Velcro®), or other suitable attachment, for example. Of course, the housing 51 may also be attached to the dash board or other suitable location within the vehicle passenger compartment 34.

A battery may be included within the housing 51 for powering the wireless receiver 21 and warning indicator 17. Another possibility is to connect the housing 51 to the battery of the vehicle 12 via an adapter, such as a cigarette lighter adapter, for example (not shown). Of course, a wire or wires may also be used to connect the proximity sensor 15 with the warning indicator 17 inside the vehicle passenger compartment 34 rather than using the wireless transmitter 20 and wireless receiver 21.

The visual warning indicator 17' may be a light emitting diode (LED), for example, as shown in FIG. 4. Here, the interior rearview mirror 50 includes a frame 52 with mirror glass 53 mounted therein, and the housing 51 is carried by the frame. As shown, the housing 51 includes a single LED 17' which may have a characteristic that varies with a distance between the rear of the vehicle 12 and the object 11. For example, the LED 17' may flash on and off at a frequency, and the frequency may become faster as the distance decreases and slower as the distance increases. As such, the driver will know how close the vehicle 12 is to the object 11 without having to get out of the vehicle to look. This may be particularly desirable for truck drivers backing up to a loading dock, drivers attempting to parallel park between two automobiles, and in numerous other situations.

Figure 5:
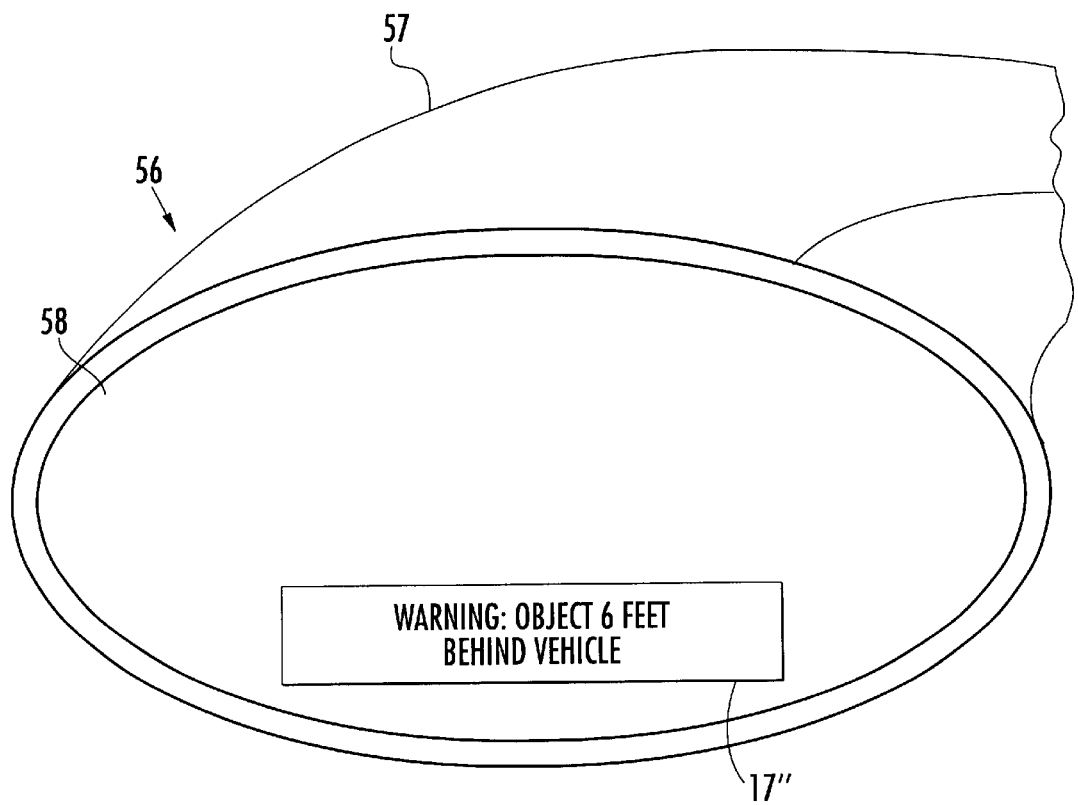
FIG. 5 is a perspective view of a vehicle rearview mirror illustrating another embodiment of the warning indicator of FIG. 2.
Figure 6:
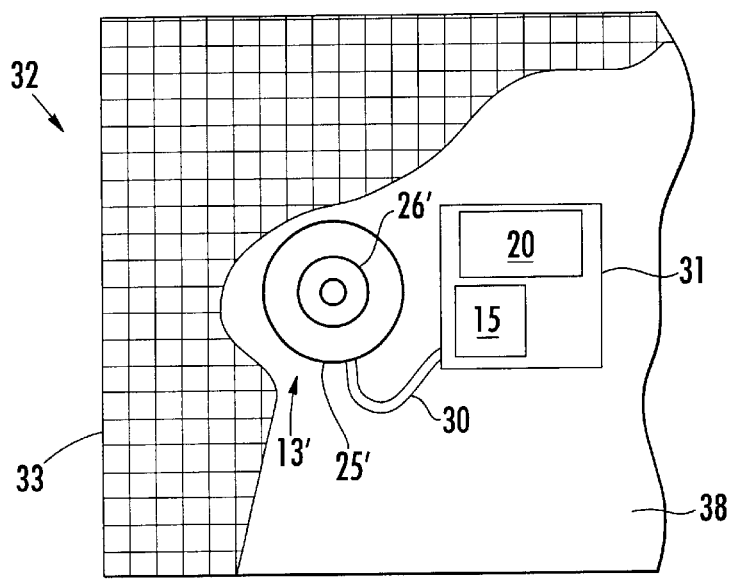
FIG. 6 is a perspective view of a vehicle rear light housing including an alternate embodiment of a back-up warning device according to the invention.

Of course, many other configurations are also possible, such as multiple LEDs each representing a particular distance to the object (e.g., four feet, three feet, etc.), for example. In addition, a visual warning indicator 17", such as an alphanumeric display, may also be carried by an exterior rearview mirror 56 of the vehicle 12, as illustrated in FIG. 5. The exterior rearview mirror 56 includes a frame 57 with mirror glass 58 therein. The alphanumeric display 17" may provide a warning message as the object 11 comes within range of the proximity sensor 15. Moreover, the alphanumeric display 17" may display a distance from the rear of the vehicle 12 to the object 11 that is updated as the distance changes. Of course, the alphanumeric display 17" may be carried by the interior rearview mirror 50, or the LED 17' may be carried by the exterior rearview mirror 56, for example. Many other visual warning indicators and combinations thereof may be used in accordance with the invention, as will be appreciated by those of skill in the art.

As noted above, the warning indicator 17 may be an audible tone warning indicator. The audible tone warning indicator 17 may similarly be mounted within the passenger compartment 34 as described above with respect to the LED indicator 17'. Also, an audible tone warning indicator 24 may be positioned within the rear light housing 32 and electrically connected to the proximity sensor 15. The audible tone warning indicator 24 may either be used in place of the warning indicator 17 or may be used in conjunction therewith. Thus, if both audible tone warning indicators 17, 24 are used, both the driver and a person adjacent the rear of the vehicle 12 will be alerted that the vehicle is backing toward the person. One particular advantage of using the audible tone warning indicator 17 in the vehicle passenger compartment 34 is that the audible tone therefrom need not be as shrill and loud as in prior art devices because of its proximity to the driver.

By way of example, the audible tone warning indicators 17, 24 may be speakers, piezoelectric elements, or other suitable devices known to those of skill in the art. Similar to the LED warning indicator 17' described above, the audible tone warning indicators 17, 24 may generate an audible tone having a characteristic which varies based upon a distance between the rear of the vehicle 12 and the object 11. For example, a frequency of the audible tone may increase as the distance between the vehicle 12 and the object 11 decreases. Again, this will allow the driver to know how far the object 11 is from the rear of the vehicle 12 without having to get out and look. Those skilled in the art will appreciate that the visual warning indicators 17', 17" described above may also be used in conjunction with the audible tone warning indicators 17, 24 in accordance with the invention.

Numerous embodiments of the proximity sensor connector 13 are possible according to the invention. For example, the housing 25 may extend radially outward from the plug 35 and carry the proximity sensor 15 thereon, as illustrated in FIG. 3. The warning indicator 24 and/or the wireless transmitter 20 may also be mounted on the housing 25. According to another embodiment illustrated in FIG. 6, the proximity sensor 15 may be spaced apart from the connector 13' and connected thereto by at least one wire 30.

More specifically, the proximity sensor 15 may be mounted on a circuit board 31, for example, which is connected to the proximity sensor connector 13' by the wire 30. The circuit board 31 may include an adhesive on the back, for example, so that it may easily be mounted on the reflector 38 within the rear light housing 32 adjacent the proximity sensor connector 13'. The wireless transmitter 20 and/or the warning indicator 24 may also be mounted on the circuit board 31. The circuit board 31 is also preferably mounted beneath the lens 33, which may protect the circuit board from moisture as well as physical damage. Of course, the selection and/or adjustment of the proximity sensor 15 may need to account for the lens 33 so that the proximity sensor does not produce false indications, as will be appreciated by those skilled in the art.

It is also possible to mount the circuit board 31 outside of the housing 32. In such case, the circuit board 31 may be connected to the proximity sensor connector 13' via the wire 30. Alternatively, a wireless link may be established between the proximity sensor connector 13' and circuit board 31 using a wireless transmitter and receiver, as similarly described above. Of course, proper sealing and placement may need to be taken into account if the circuit board 31 is installed outside the rear light housing 32 to avoid damage to the circuit board.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A back-up warning system for a vehicle of a type comprising a back-up bulb connector, the back-up warning system comprising:
   a proximity sensor for positioning adjacent a rear of the vehicle;
   a proximity sensor connector for connecting said proximity sensor to the back-up bulb connector so that said proximity sensor is powered and operable to detect proximity of an object adjacent the rear of the vehicle when the vehicle is backing up;
   a warning indicator for providing a warning indication based upon said proximity sensor; and
   a back-up light bulb carried by said proximity sensor connector and electrically connected to the vehicle back-up bulb connector.

2. The back-up warning system of claim 1 wherein the vehicle comprises a vehicle passenger compartment; and wherein said warning indicator is for positioning within the vehicle passenger compartment.

3. The back-up warning system of claim 1 wherein the vehicle further comprises a rear light housing covering the back-up bulb connector; and wherein said proximity sensor is adjacent said proximity sensor connector to be within the rear light housing.

4. The back-up warning system of claim 3 further comprising a wireless communications link connecting said proximity sensor and said warning indicator.

5. The back-up warning system of claim 4 wherein said wireless communications link comprises:
a wireless transmitter for positioning within the vehicle rear light housing and connected to said sensor; and
a wireless receiver for positioning within the vehicle passenger compartment and connected to said warning indicator.

6. The back-up warning system of claim 3 wherein said warning indicator is for positioning within the rear light housing, and is electrically connected to said proximity sensor.

7. The back-up warning system of claim 1 wherein said warning indicator comprises a visual warning indicator.

8. The back-up warning system of claim 7 wherein the vehicle comprises at least one rearview mirror; and wherein said visual warning indicator is carried by the at least one rearview mirror.

9. The back-up warning system of claim 1 wherein said warning indicator comprises an audible tone warning indicator.

10. The back-up warning system of claim 9 wherein said audible tone warning indicator generates an audible tone having a characteristic which varies based upon a distance between the rear of the vehicle and the object.

11. The back-up warning system of claim 1 wherein said proximity sensor is spaced apart from said proximity sensor connector and connected thereto by at least one wire.

12. The back-up warning system of claim 1 wherein said proximity sensor is carried by said proximity sensor connector.

13. The back-up warning system of claim 1 wherein said proximity sensor comprises a radar sensor.

14. The back-up warning system of claim 1 wherein said proximity sensor connector further comprises a housing; and wherein said proximity sensor comprises sensing circuitry carried by said housing.

15. The back-up warning system of claim 14 wherein said sensing circuitry comprises a signal emitter for emitting signals, and a signal collector for collecting reflected signals from the object.

16. The back-up warning system of claim 1 wherein the vehicle back-up bulb connector comprises a socket, and said proximity sensor connector comprises a plug mating with the socket.

17. A back-up warning system for a vehicle of a type comprising a rear light housing and a back-up bulb connector therein, the back-up warning system comprising:
a proximity sensor for positioning within the rear light housing;
a proximity sensor connector for connecting said proximity sensor to the back-up bulb connector so that said proximity sensor is powered and operable to detect proximity of an object adjacent the rear of the vehicle when the vehicle is backing up;
a warning indicator for providing a warning indication based upon said proximity sensor; and
a wireless communications link connecting said proximity sensor and said warning indicator.

18. The back-up warning system of claim 17 wherein the vehicle comprises a vehicle passenger compartment; and wherein said warning indicator is for positioning within the vehicle passenger compartment.

19. The back-up warning system of claim 18 wherein said wireless communications link comprises:
a wireless transmitter for positioning within the vehicle rear light housing and connected to said sensor; and
a wireless receiver for positioning within the vehicle passenger compartment and connected to said warning indicator.

20. The back-up warning system of claim 17 wherein said warning indicator comprises a visual warning indicator.

21. The back-up warning system of claim 20 wherein the vehicle comprises at least one rearview mirror; and wherein said visual warning indicator is carried by the at least one rearview mirror.

22. The back-up warning system of claim 17 wherein said warning indicator comprises an audible tone warning indicator.

23. The back-up warning system of claim 22 wherein said audible tone warning indicator generates an audible tone having a characteristic which varies based upon a distance between the rear of the vehicle and the object.

24. The back-up warning system of claim 17 wherein said proximity sensor is closely spaced apart from said proximity sensor connector and connected thereto by at least one wire.

25. The back-up warning system of claim 17 wherein said sensor is carried by said proximity sensor connector.

26. The back-up warning system of claim 17 further comprising a back-up light bulb carried by said proximity sensor connector and electrically connected to the vehicle back-up bulb connector.

27. The back-up warning system of claim 17 wherein said proximity sensor comprises a radar sensor.

28. The back-up warning system of claim 17 wherein said proximity sensor connector further comprises a housing; and wherein said proximity sensor comprises sensing circuitry carried by said housing.

29. The back-up warning system of claim 28 wherein said sensing circuitry comprises a signal emitter for emitting signals, and a signal collector for collecting reflected signals from the object.

30. The back-up warning system of claim 17 wherein the vehicle back-up bulb connector comprises a socket, and said proximity sensor connector comprises a plug mating with the socket.

31. A back-up warning system for a vehicle of a type comprising a back-up bulb socket, the back-up warning system comprising:
a proximity sensor for positioning adjacent a rear of the vehicle;
a plug to be mated with the back-up bulb socket for electrically connecting said proximity sensor to the back-up bulb socket so that said proximity sensor is powered and operable to detect proximity of an object adjacent the rear of the vehicle when the vehicle is backing up; and
a warning indicator for providing a warning indication based upon said proximity sensor.

32. The back-up warning system of claim 31 wherein said warning indicator comprises a visual warning indicator for providing a visual warning indication based upon said proximity sensor; wherein the vehicle comprises at least one rearview mirror; and wherein said visual warning indicator is carried by the at least one rearview mirror.

33. The back-up warning system of claim 31 wherein the vehicle comprises a vehicle passenger compartment; and wherein said warning indicator is for positioning within the vehicle passenger compartment.

34. The back-up warning system of claim 33 wherein the vehicle further comprises a rear light housing covering the back-up bulb socket; and wherein said proximity sensor is adjacent said plug to be within the rear light housing.

35. The back-up warning system of claim 34 further comprising a wireless communications link connecting said proximity sensor and said warning indicator.

36. The back-up warning system of claim 35 wherein said wireless communications link comprises:
- a wireless transmitter for positioning within the vehicle rear light housing and connected to said sensor; and
- a wireless receiver for positioning within the vehicle passenger compartment and connected to said warning indicator.

37. A back-up warning device for a vehicle of a type comprising a back-up bulb socket, the back-up warning system comprising:
- a plug to be mated with the back-up bulb socket; and
- a proximity sensor adjacent said plug and electrically connected to the back-up bulb socket by said plug so that said proximity sensor is powered and operable to detect proximity of an object adjacent the rear of the vehicle when the vehicle is backing up.

38. The back-up warning device of claim 37 wherein said back-up warning device comprises a housing connected to said plug; and wherein said proximity sensor comprises sensing circuitry carried by said housing.

39. The back-up warning device of claim 38 wherein said sensing circuitry comprises a signal emitter for emitting signals, and a signal collector for collecting reflected signals from the object.

40. The back-up warning device of claim 37 further comprising a back-up bulb carried by said housing.

41. A method for providing a warning indication of an object adjacent a rear of a vehicle of a type comprising a back-up bulb connector, the method comprising:
- positioning a proximity sensor adjacent the rear of the vehicle;
- connecting the proximity sensor to the back-up bulb connector using a proximity sensor connector so that the proximity sensor is powered and operable when the vehicle is backing up, the proximity sensor connector comprising a back-up light bulb socket electrically connected to the vehicle back-up bulb connector;
- inserting a back-up light bulb into the back-up light bulb socket of the proximity sensor connector so that the back-up light bulb is powered and operable when the vehicle is backing up;
- detecting proximity of the object adjacent the rear of the vehicle using the proximity sensor when the vehicle is backing up; and
- providing the warning indication based upon the detected proximity.

42. The method of claim 41 wherein the vehicle further comprises a rear light housing covering the back-up bulb connector; and wherein positioning the proximity sensor comprises positioning the proximity sensor adjacent the back-up bulb connector to be within the rear light housing.

43. The method of claim 42 wherein providing the warning indication comprises providing the warning indication from within the rear light housing.

44. The method of claim 41 wherein the vehicle comprises a vehicle passenger compartment; and wherein providing the warning indication comprises providing the warning indication within the vehicle passenger compartment.

45. The method of claim 44 wherein providing the warning indication within the vehicle passenger compartment comprises providing the warning indication within the vehicle passenger compartment via a wireless communications link.

46. The method of claim 41 wherein providing the warning indication comprises providing a visual warning indication.

47. The method of claim 46 wherein the vehicle comprises at least one rearview mirror; and wherein providing a visual warning indication comprises providing the visual warning indication at the rearview mirror.

48. The method of claim 41 wherein providing the warning indication comprises providing an audible tone warning indication.

49. The method of claim 48 wherein providing the audible tone warning indication comprises providing an audible tone having a characteristic which varies based upon a distance between the rear of the vehicle and the object.

* * * * *